US012703651B2

(12) United States Patent
Guy et al.

(10) Patent No.: US 12,703,651 B2
(45) Date of Patent: Aug. 11, 2026

(54) SATCHEL DISPENSER WITH AN ISOLATED DISPERSANT CHAMBER

(71) Applicant: King Technology, Inc., Minnetonka, MN (US)

(72) Inventors: David Guy, Maple Grove, MN (US); Jeffrey D Johnson, Edina, MN (US); Eric Barton, Eden Prairie, MN (US); Darrin M Swagel, Minnetonka, MN (US); Daniel Longhenry, Bloomington, MN (US)

(73) Assignee: King Technology, Inc., Minnetonka, MN (US)

( * ) Notice: Subject to any disclaimer, the term of this patent is extended or adjusted under 35 U.S.C. 154(b) by 660 days.

(21) Appl. No.: 18/116,465

(22) Filed: Mar. 2, 2023

(65) Prior Publication Data

US 2023/0348301 A1 Nov. 2, 2023

Related U.S. Application Data

(60) Provisional application No. 63/372,326, filed on Mar. 4, 2022.

(51) Int. Cl.
*C02F 1/68* (2023.01)
*C02F 103/42* (2006.01)

(52) U.S. Cl.
CPC .......... *C02F 1/688* (2013.01); *C02F 2103/42* (2013.01)

(58) Field of Classification Search
CPC ...... C02F 1/688; C02F 2103/42; C02F 1/505; C02F 1/52; C02F 1/683; C02F 1/685; C02F 1/76; C02F 2201/006
See application file for complete search history.

(56) References Cited

U.S. PATENT DOCUMENTS

| | | | | |
|---|---|---|---|---|
| 2001/0054578 | A1* | 12/2001 | King | A01N 25/26 210/206 |
| 2007/0181577 | A1* | 8/2007 | Jones, Jr. | B65D 51/1605 220/780 |
| 2009/0071891 | A1* | 3/2009 | King | C02F 1/688 210/232 |
| 2011/0100890 | A1* | 5/2011 | Brotman | C02F 9/20 210/202 |
| 2012/0111193 | A1* | 5/2012 | Zarecki | B01D 53/0446 95/156 |

* cited by examiner

*Primary Examiner* — Hayden Brewster
(74) *Attorney, Agent, or Firm* — Fredrikson & Byron, P.A.

(57) ABSTRACT

A dispenser securable in a hostile environment of a body of recreational water with the dispenser having a dispersant chamber with a dispersant therein isolated from the hostile water environment proximate the dispenser to enable dispenser placement in various locations within the body of recreational water without adversely affecting a dispenser dispersant rate.

12 Claims, 4 Drawing Sheets

FIG. 1
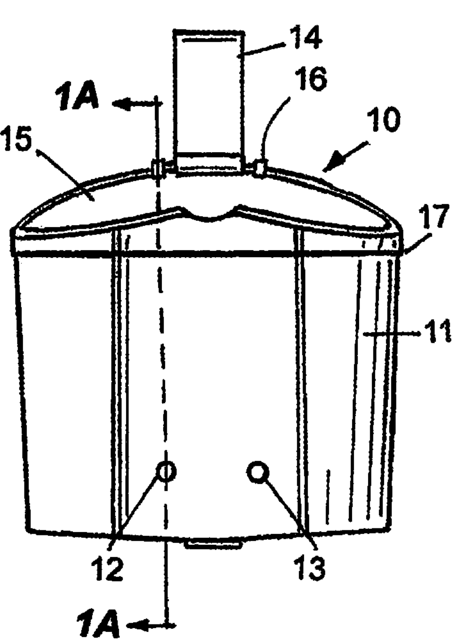
FIG. 1A
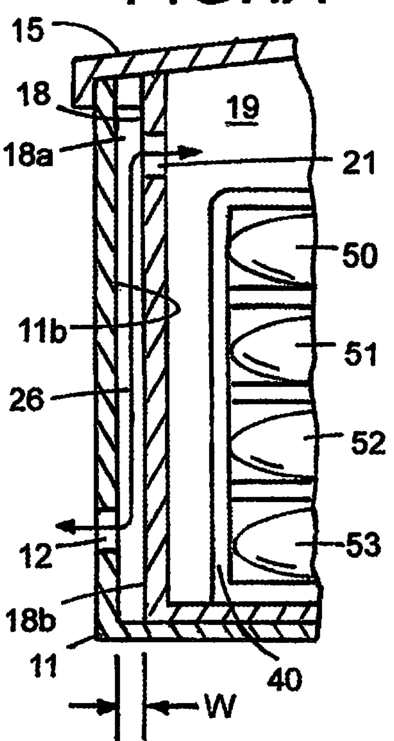
FIG. 2
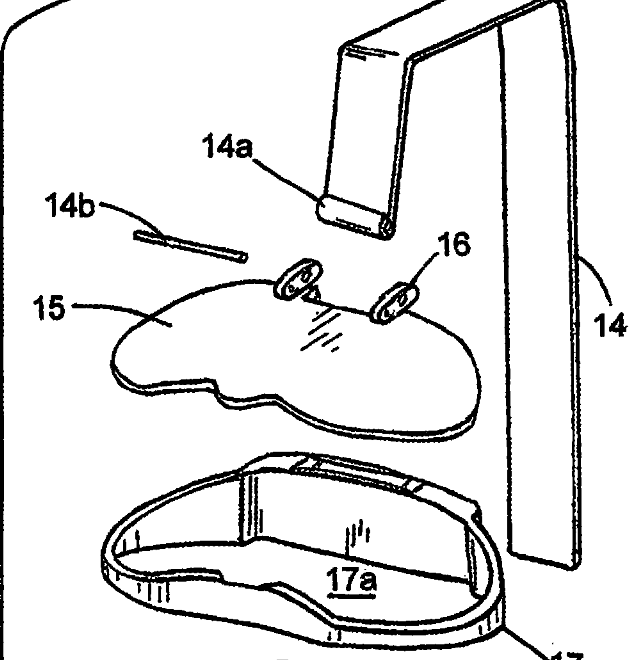
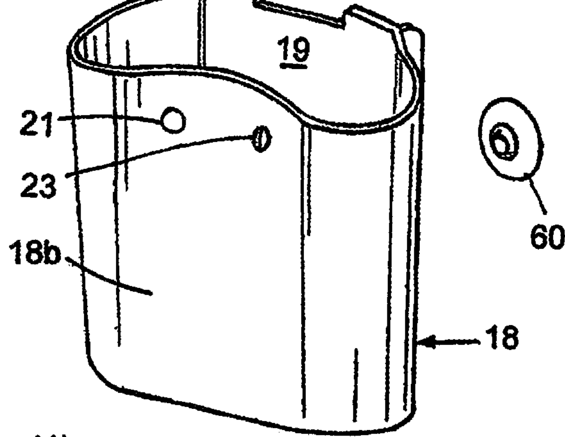
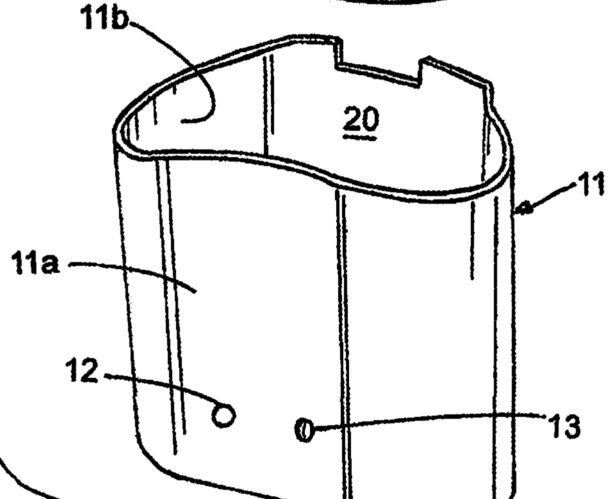

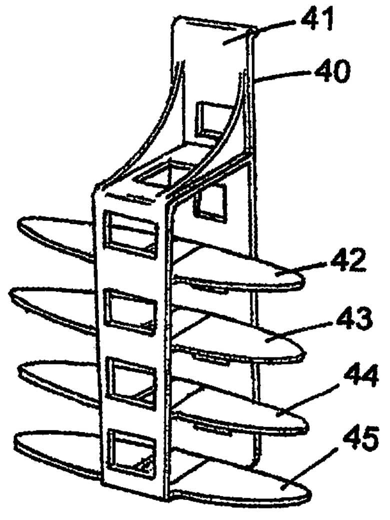
FIG. 4
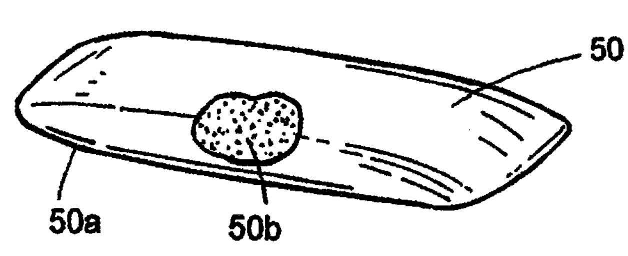
FIG. 5
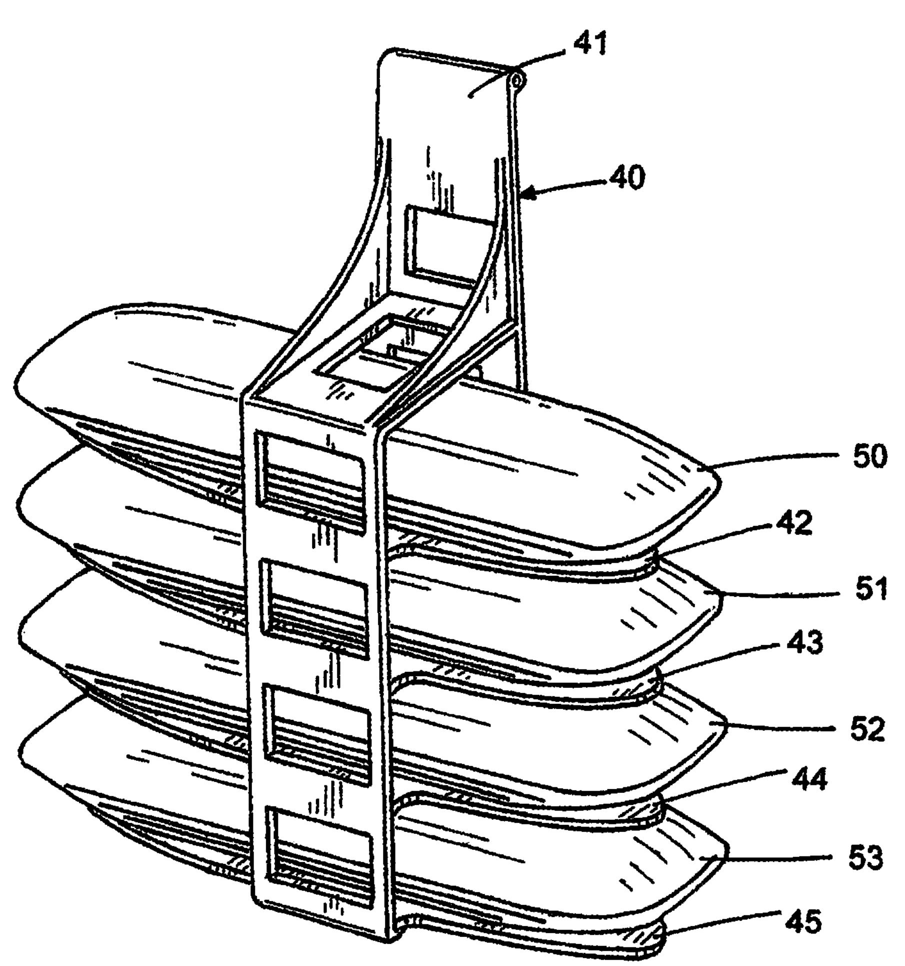

16
10
11
60
14
14a 14
61
41
10
30
15
25

14
61
41
16
30
10
25
15

41
40
50
51
42
52
43
53
44
45
15
18
19
18c
25

SATCHEL DISPENSER WITH AN ISOLATED DISPERSANT CHAMBER

CROSS REFERENCE TO RELATED APPLICATIONS

This application claims the benefit U.S. Provisional Patent Application No. 63/372,326, filed Mar. 4, 2022.

BACKGROUND OF THE INVENTION

The dispensing rate of dispensers used in swimming pools or swim spas, as well as other bodies of recreational water, can be affected by the location or position of the dispenser within the circulating water system. Typically, dispensers used in circulating water systems for bodies of recreational water have a dispersant compartment with a set of water ports for ingress and egress of water with the egress of water carrying a dispersant into the body of water to affect water conditions in other parts of the water system as dispersants are continually dispensed from the dispersant compartment into the circulating water system through the water ports located in the dispenser. One of the difficulties with placement of a dispenser with fixed sized water ports or variable size water ports is that in different areas of the pool, the water conditions, i.e., the water flow, past or through the dispenser can change the dispensing rate. For example, one area of a pool such as a pump basket may contain turbulent water conditions. In such cases the dispersant rate may be substantially higher than if the same dispenser is placed in an open area of a water system where the water is stagnant or slow moving i.e., placid. In both cases the dispersant in the dispenser diffuses out of the dispenser through water ports in the dispenser housing. However, because of the energy of the water proximate the water ports in the dispenser, the dispersant rate from the dispenser may change substantially based on the location of the dispenser in the water system.

Consequently, when one places a dispenser in a region of the body of water where the water flow is slow or placid, the dispenser releases the dispersant into the body of water at a first dispersant rate but if the same dispenser with the same size water ports is placed in a region of the body of recreational water that contains rapid water flow or turbulence the the dispersant rate may be substantially higher, which may be an unwanted outcome. For example, if the dispensing rate for a pool dispenser that contains metals is too high the dispersant may not be absorbed or diluted within the dispenser causing the dispersant to be carried into the body of water of the pool before the dispersant is absorbed or diluted, which can cause staining of the pool.

SUMMARY OF THE INVENTION

A satchel dispenser mountable in different locations within a circulating water system of a body of recreational water with the satchel dispenser mitigating the effect of water conditions, which are proximate the exterior of the satchel dispenser. The satchel dispenser includes a set of nested containers that require ingress and egress of water through a first set of water ports in an outer housing of an outer container and then ingress and egress of water through a passage between the outer housing and an inner housing and finally ingress and egress of water into a plenum chamber or dispensing chamber in the inner housing, which contains a removable carrier supporting a plurality of dispensing pods for simultaneously dispensing multiple dispersants into the water in the plenum chamber within the satchel dispenser. Once the dispersants in the satchel dispenser dissipate into water within the plenum chamber the water with the dispersant therein exits the satchel dispenser in an opposite direction from the direction of water entering the plenum chamber. Consequently, the satchel dispenser isolates the dispersants in the plenum chamber by providing a tortuous water path in and out of the satchel dispenser, which can include viscous damping as the water flows through the satchel dispenser, thereby mitigating effects of water conditions proximate the exterior of the satchel dispenser, which could influence the dispensing rate of the satchel dispenser. For example, placid water conditions as opposed to hostile water conditions, which can include rapidly moving water, swirling water flow, i.e., eddies or in some cases turbulence, are prevented from coming into direct contact with the dispersants in the plenum chamber and thus affecting the dispensing rate of the dispersants.

A further benefit of the invention is that the invention provides an isolated release of the dispersants through water contact within the plenum chamber of the satchel dispenser to limit or prevent pool staining from occurring when the dispersants include a metal ion such as a copper ion. That is, after water contact with the dispersants within the plenum chamber dispersants are released into the water within the plenum chamber; however, for dispersants in the water within the plenum chamber to enter the main body of water outside the dispenser the dispersants must follow a tortuous water path in a direction opposite a tortuous water path the water followed when water entered the plenum chamber thus effectively isolating a dispersant within the plenum chamber from immediate contact with the main body of recreational water outside the dispenser. Similarly, oxidation of metal ions in the water typically takes place at the initial point where the concentrated levels of chlorine from the halogen dispersant are mixed with the of water of the spa or pool. These oxidized metals typically stain the housing in the immediate area around the opening of the dispenser chamber that holds the halogen dispersant. The space between the two housings allows the halogen that is dispensed from the inner chamber to further dilute before leaving the outer chamber and entering the main body of water. By having a secondary chamber around the first it allows the stains to be hidden from view of the user, thus maintaining the attractive appearance of the outer housing.

BRIEF DESCRIPTION OF THE DRAWINGS

FIG. 1 is a front view of a satchel dispenser;

FIG. 1A is a sectional view of the satchel dispenser of FIG. 1;

FIG. 2 is an exploded view of the satchel dispenser of FIG. 1;

FIG. 3 is a dispensing pod carrier for insertion into the satchel dispenser of FIG. 1;

FIG. 4 is a dispensing pod;

FIG. 5 is the dispensing pod carrier of FIG. 3 with a separate dispensing pod located on each of the shelves of the dispensing pod carrier;

DESCRIPTION OF THE PREFERRED EMBODIMENT

Figures 6, 7:
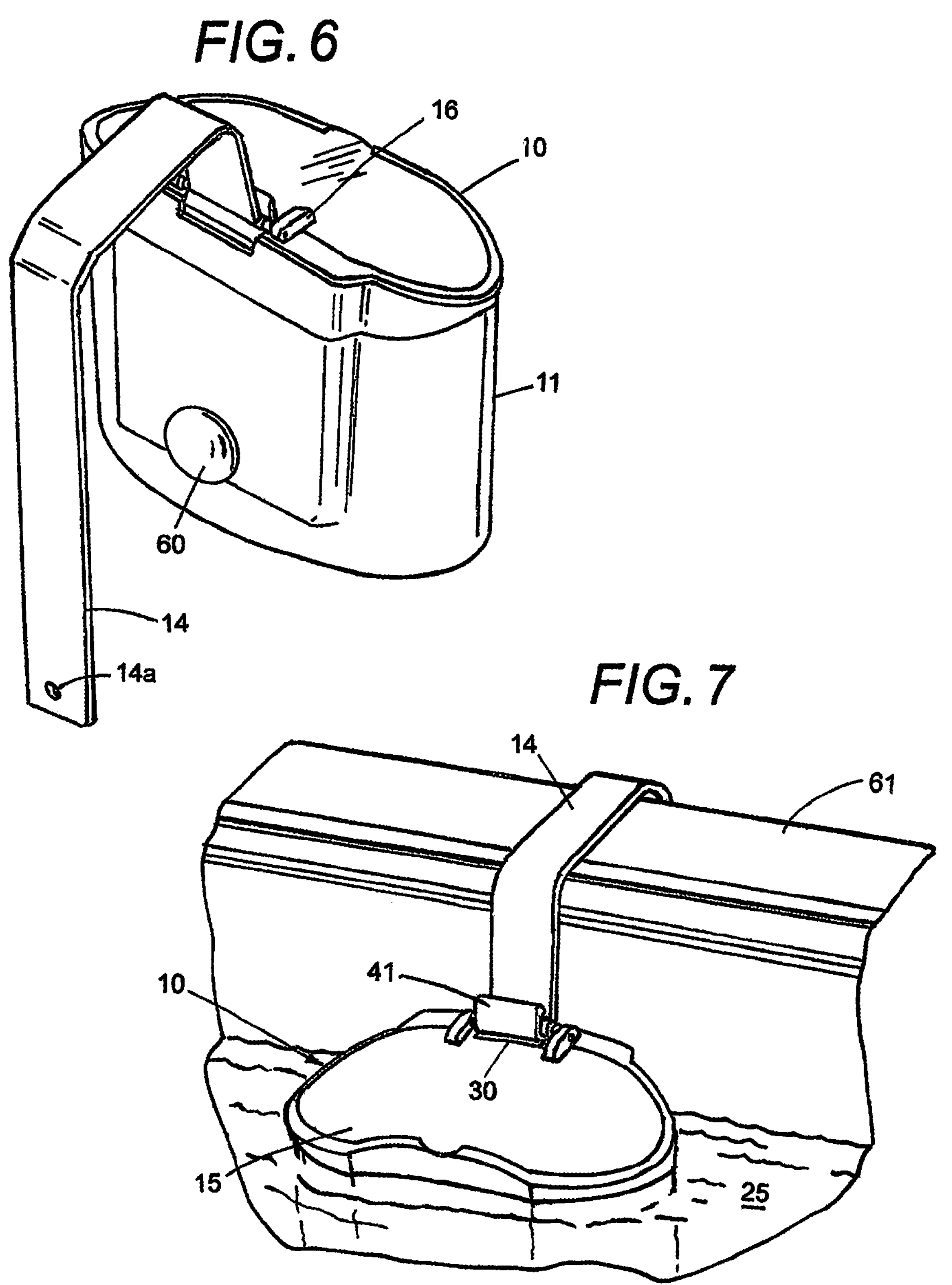
FIG. 6 is a back view of the satchel dispenser of FIG. 1 revealing a suction cup attachable to a pool surface and a flexible pool connector strap attachable to a portion of a pool structure.
FIG. 7 shows the satchel dispenser of FIG. 1 mounted to a sidewall of a pool or swimming spa with a flexible connector and an extension, i.e., a finger tab of the pod carrier, extending partially through an opening in the lid of the satchel dispenser.

FIG. 1 is a front view of a satchel dispenser 10 and FIG. 2 is an exploded view of satchel dispenser 10. Satchel dispenser 10 includes an outer container i.e. housing 11 having an exterior surface 11*a* and an interior surface 11*b* with a pivotal lid 15 forming a top closure to the satchel dispenser, which when open, reveals a dispersant container 18 located in a nesting relationship within an interior compartment 20 of housing 11. FIG. 1 reveals a rim 17 on a top end of outer housing 11*a* that provides a support and closure stop for pivotal lid 15 through hinges 16 and FIG. 2 shows satchel dispenser top opening 17*a*, which is covered by lid 15 when satchel dispenser 10 is in use.

FIG. 1A is a sectional view of dispenser 10 taken along lines 1A-1A of FIG. 1 showing a dispersant chamber in dispersant container 18 comprising a plenum chamber 19 where water contacts dispersants in an isolated water condition. In this example dispersant container 18 contains a plurality of solid dispersants within a set of dispensing pods 50, 51, 52, and 53, which are supported by a dispensing pod carrier 40. Although multiple dispensing pods are shown a single dispensing pod or dispersant may be held in dispersant container 18. As illustrated in FIG. 1A and FIG. 2 dispersant container 18 forms a nesting relationship within outer container 11, i.e., a double wall with a gap 18*a* of width “w” therebetween, which provides a path for water to flow into and out of plenum chamber 19 in inner container 18. The double wall with gap 18*a* as well as water ports 12 and 13 in container 11, which are offset from water ports 21 and 23 in dispersant container 18, shield dispersants located in plenum chamber 19 from direct effects of water currents or turbulence outside the dispenser and consequently prevent hostile water conditions outside the dispenser 10 from adversely affecting a dispersant dispensing rate within the plenum chamber 19 since the energy of water entering the plenum chamber 19 is dissipated before the water enters plenum chamber 19. In addition to isolating dispersants within plenum chamber 19 from direct effects of hostile water conditions outside the satchel dispenser 10, the satchel dispenser 10 also limits or prevents staining of pool structure as the dispersants dissipated within the plenum chamber 19 linger therein and must follow a tortuous path to enter the body of water outside the satchel dispenser.

FIG. 2 is an exploded view of FIG. 1 showing inner container 18 with a first water port 21 and a second water port 23, which are located at a top end of container 18 to provide water access to plenum chamber 19. Similarly, outer container 11 contains a first water port 12 and a second water port 13, which are located at a bottom end of outer container 11 to provide ingress and egress of water into an intermediate gap chamber 18*a*, which FIG. 1A shows is located between a portion of the inside wall 11*b* of container 11 and a portion of the outside wall 18*b* of container 18.

The two headed arrow 26 in FIG. 1A illustrates water flow through the intermediate gap chamber 18 due a staggering and spacing of outside container water ports 12, 13 with respect to inside container water ports 21, 23. That is, the staggering and spacing of outside water ports 12, 13 with respect to inside water ports 21, 23 forces water entering through water ports 12, 13 to flow through the intermediate gap chamber 18*a*, between an inner sidewall 11*b* of housing 11 and an outer sidewall 18*b* of housing 18, before the water contacts a dispersant located in plenum chamber 19. In this example the water ports in the inner container 18 are in non-alignment with the water ports in the outer container thereby preventing a direct flow of water into and out of plenum chamber 19. Consequently, the intermediate gap chamber 18*a*, causes water flowing therein to lose or dissipate energy, which can include viscous damping provided by outer sidewall 18*b* of container 18 and inner sidewall 11*b* of container 11.

FIG. 3 shows an example of a dispensing pod carrier 40, which is insertable into plenum chamber 19 in satchel dispenser 10. Dispensing pod carrier 40 includes a set of four elongated shelves 42, 43, 44 and 45 that can each support a dispensing pod in a dispensable condition. A feature of dispensing pod carrier 40 is that the dispensing pod carrier is sufficiently buoyant so that dispensing pod carrier 40 floats upward within the plenum chamber 19 after dispersants within the dispensing pods have been consumed or partially consumed thereby providing a visual alert that one or more dispending pod should be replaced. If desired additional flotation can be attached to dispensing pod carrier to coincide with release of dispersants. In other cases, floatation may be included within the dispensing pod to coincide with the release of dispersants.

FIG. 4 shows an example of a dispensing pod 50, which has an outer porous fabric or porous mesh 50*a* that contains a dispersant 50*b* therein. Examples of dispersants include halogens, algaecides, flocculants, chelators, silver, or minerals although other dispersants containable within the plenum chamber may be used without departing from the spirit and scope of the invention. One places dispensing pod 50 within plenum chamber 19 in satchel dispenser 10 to allow water in plenum chamber 19 to contact the dispensing pod and release the dispersant therein. In the example shown in FIG. 5 the elongated dispensing pods 50, 51, 52 and 53 are stack mounted on the elongated shelves 42, 43, 44, and 45 of dispensing pod carrier 40.

The dispensing pods described herein have a water penetrable outer cover 50*a*, for example a porous fabric or mesh, that allows water access to the dispersant therein. For example, during a dispensing phase the water in plenum chamber 19 penetrates outer water penetrable cover 50*a* to contact dispersant 50*b*, which is confined within dispensing pod 50. In the example shown the dispersant 50*b* comprises a solid that is released into plenum chamber 19 through water penetration of outer cover 50*a*. Although no limitation is intended thereto examples of typical dispersants usable in dispensing pod 50 include halogens, algaecides, flocculants, chelators, silver, or minerals. An example of a suitable halogen is SmartChlor®, which is sold by King Technology, Inc.

FIG. 5 shows dispensing pod carrier 40 of FIG. 3 with a shelf 42 supporting dispensing pod 50 in a dispensing condition thereby enabling water contact with dispersant 50*b* in dispensing pod 50 as shelf 42 supports pod 50 within plenum chamber 19. Similarly, shelf 43 supports dispensing pod 51 in a dispensing condition, shelf 44 supports dispensing pod 52 in a dispensing condition and shelf 45 supports dispensing pod 53 in a dispensing condition.

A feature of the invention is that multiple dispensing pods can be supported within the satchel dispenser 10, which allows one to place different dispersants within the plenum chamber 19 of the satchel dispenser to simultaneously dispense multiple dispersants into the body of recreational water without hostile water conditions outside the satchel dispenser adversely affecting the dispersant rate of the dispenser. Alternately, the invention is also suitable for dispensing a single dispersant contained within the plenum chamber 19 where the dispersant may not be contained within a dispensing pod.

FIG. 6 shows a back side of satchel dispenser 10 revealing a suction cup 60, with the back side of suction cup secured to outer container 11 to hold the suction surface of suction cup 60 in a position for removable attachment to a flat pool surface. This type of attachment is useful to prevent satchel dispenser from being tossed about in a pool in response to water currents in the body of recreational water, which for example may a swimming pool of a swim spa. Satchel dispenser 10 also includes a flexible connector such as a strap 14 that mounts to satchel dispenser 10 through a cylindrical bearing 14*a* and a cylindrical pin 14*b*, which is shown in exploded view of FIG. 2. One can use connector 14 to tether the satchel dispenser structure within a pool to further limit displacement of the satchel dispenser due to hostile water conditions. Thus, satchel dispenser 10 provides a flexible connector and suction cup for securement of the satchel dispenser 10 within the structure containing the body of recreational water.

FIG. 7 shows satchel dispenser 10 in a body of water 25 with the satchel dispenser attached to pool structure 61, which may be a sidewall of a pool or spa, by the suction cup 60 shown in FIG. 6. In addition, connector strap 14 also connects to a further portion (not shown) of the pool structure 61 to further limit movement of satchel dispenser 10 with respect to water motion proximate the satchel dispenser. Thus strap 14 and suction cup 60 act together to limit satchel dispenser 10 from being tossed about due to hostile water conditions such as found within a swimming pool or swim spa.

Figures 8, 9:
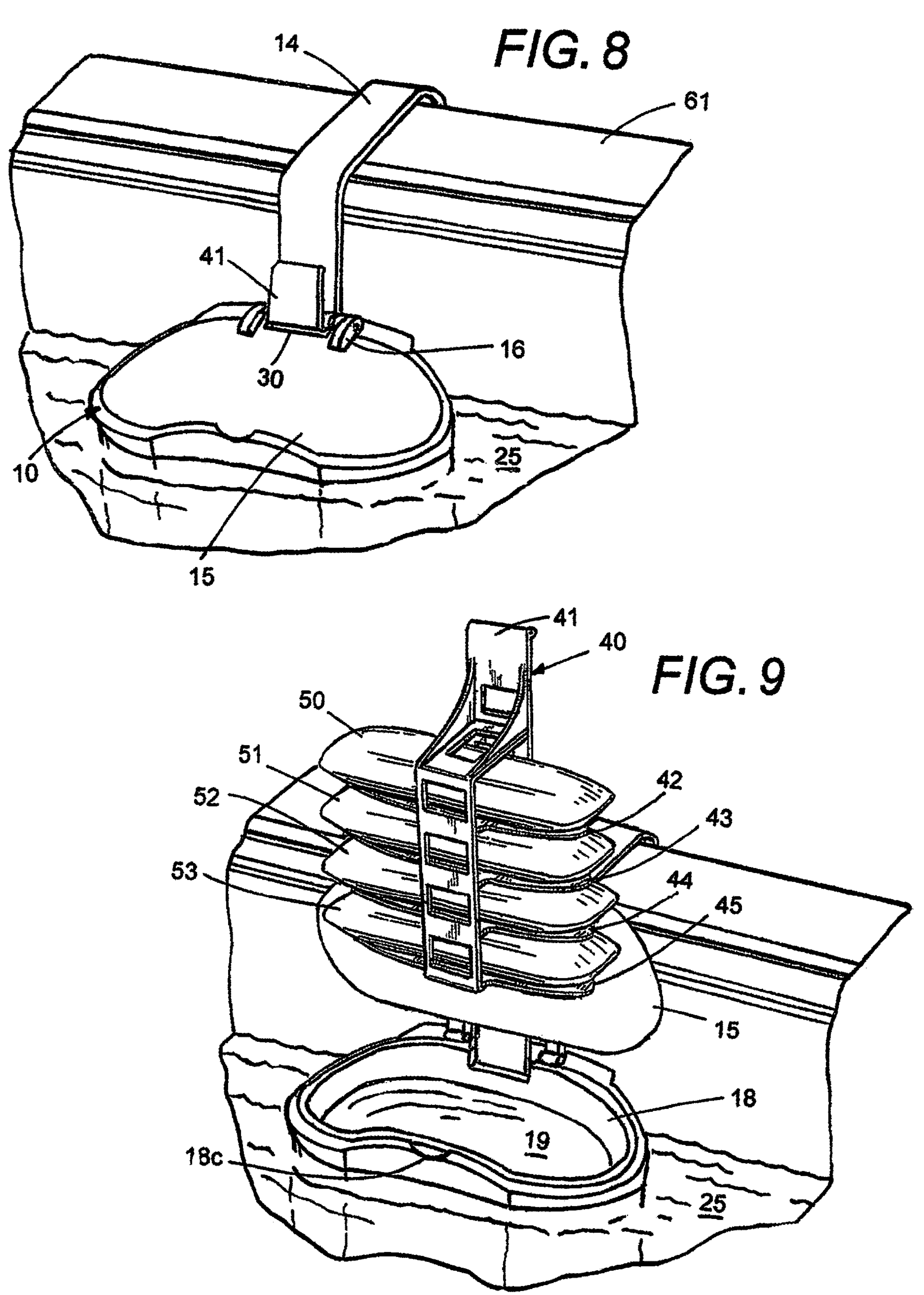
FIG. 8 shows a finger tab on the dispensing pod carrier extended upward from the top of the lid of the satchel dispenser providing a visual alert that dispensing pods within the satchel dispenser need replacement.
FIG. 9 shows the dispensing pod carrier of FIG. 3 about to be inserted into a plenum chamber in the satchel dispenser through grasping the finger tab on the dispensing pod carrier.

FIG. 7 shows a further feature of the invention, namely an elongated finger tab 41, which is located on a top end of pod carrier 40 (as shown in FIG. 3) that extends partially through an elongated opening 30 in lid 15. While finger tab 41 functions as a handle for axially insertion or removing pod carrier 40 with dispensing pods thereon from plenum chamber 19, the finger tab 41 can also function as an indicator to provide an alert to replace a dispensing pod on pod carrier 40. That is, pod carrier 40 is sufficiently buoyant so that when dispersants are dissipated the buoyance of pod carrier 40 causes pod carrier to float upward and consequently causing finger tab 41 to extend sufficiently further upward through lid 15, as shown in FIG. 8, thereby visually alerting an operator to replace a spent dispensing pod. For example, finger tab 41 may contain a bright color to alert an operator to replace a spent dispensing pod or a simple instruction such as "REPLACE".

FIG. 9 shows the dispensing pod carrier of FIG. 5 about to be axially inserted into plenum chamber 19 in the satchel dispenser 10 through finger grasping finger tab 41 on the dispensing pod carrier 40 while shelves 42, 43, 44, and 45 support dispensing pods 50, 51, 52 and 53. Thus, a feature of the invention is the ability to replace all or just one of the dispensing pods by merely lifting dispensing pod carrier 40 out of plenum chamber 19 when lid 15 is open.

We claim:

1. A satchel dispenser comprising:

a first container having a plenum chamber containing a water-soluble dispersant therein and a first set of water ports each for ingress and egress of water into and out of the plenum chamber;

a second container the first container nested within the second container thereby forming an intermediate chamber therebetween, the second container having a second set of water ports each for ingress and egress of water into and out of the intermediate chamber the first set of water ports being vertically offset from the second set of water ports and a two-way water flow passage defined by the first set of water ports, the intermediate chamber, and the second set of water ports the two-way water flow passage for ingress and egress of water into and out of the plenum chamber from a body of recreational water outside of the satchel dispenser the two-way water flow passage inhibiting a water condition proximate the second set of water ports in the second container from adversely affecting a dispensing rate of the water-soluble dispersant within the plenum chamber.

2. The satchel dispenser of claim 1 further comprising a flexible connector attachable to a structure within the body of recreational water to secure the satchel dispenser in either a fixed condition or a tethered condition in the body of recreational water as the satchel dispenser provides water access to the plenum chamber.

3. The satchel dispenser of claim 1 wherein the first set of water ports in the first container and the second set of water ports in the second container are laterally spaced from each other so that ingress and egress of water into and out of the plenum chamber flows between an inner surface of the second container and outer surface of the first container.

4. The satchel dispenser of claim 1 further comprising a lid thereon extending over the plenum chamber in the first container with the lid openable to either insert a dispensing pod into the plenum chamber or remove a dispensing pod from the plenum chamber.

5. The satchel dispenser of claim 1 wherein the second container comprises a rigid container.

6. The satchel dispenser of claim 5 wherein the first container comprises a rigid container.

7. The satchel dispenser of claim 5 wherein the second container contains a suction cup for attachment of the satchel dispenser to a surface located either below or above a water line of the body of recreational water.

8. The satchel dispenser of claim 1 further comprising a removable dispensing pod carrier located in the plenum chamber the dispensing pod carrier supporting at least two dispensing pods in a dispensing condition within the plenum chamber.

9. The satchel dispenser of claim 1 wherein the water-soluble dispersant comprises one or more of an algaecide, a flocculant, a chelator, a source silver, or a batch of minerals.

10. The satchel dispenser of claim 8 wherein the removable dispensing pod carrier supports at least two dispensing pods thereon with an exterior surface of each of the at least two dispensing pods located in a dispensing condition within the body of recreational water in the plenum chamber.

11. The satchel dispenser of claim 8 wherein the removable dispensing pod carrier comprises a rigid carrier with a plurality of shelves for supporting a plurality of dispensing pods in a dispending condition within the plenum chamber.

12. The satchel dispenser of claim 8 where the removable dispensing pod carrier includes a finger tab for insertion or removal of the dispensing pod carrier into or from the satchel dispenser.

* * * * *